(12) United States Patent
Aitken

(10) Patent No.: US 6,344,425 B1
(45) Date of Patent: Feb. 5, 2002

(54) FLUOROTELLURITE, AMPLIFIER GLASSES

(75) Inventor: Bruce G. Aitken, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/443,903

(22) Filed: Nov. 19, 1999

(51) Int. Cl.$^7$ .............................. C03C 3/15; C03C 3/16; C03C 3/23; C03C 13/04; H01S 3/17

(52) U.S. Cl. .............................. 501/43; 501/44; 501/45; 501/50; 501/37; 359/341; 359/343; 372/6; 372/40; 252/301.6 R; 252/301.4 H

(58) Field of Search .............................. 501/37, 41, 43, 501/44, 45, 50; 359/341, 343; 372/6, 40; 252/301.6 R, 301.4 R, 301.4 H, 301.6 P, 301.6 F, 301.4 P, 301.4 F

(56) References Cited

U.S. PATENT DOCUMENTS 3,690,908 A * 9/1972 Greco et al.
5,251,062 A * 10/1993 Snitzer et al. .............. 359/341

FOREIGN PATENT DOCUMENTS

| JP | 8-110535 | | 4/1996 |
| JP | 2944387 | * | 9/1999 |
| WO | 92/00925 | * | 1/1992 |

OTHER PUBLICATIONS

"1.5 μm Broadband Amplification by Tellurite–Based EDFAs" Mori et al., NTT Opto–Elec Labs, pp PD1–PD4. (No Date Available.
"Optical Absorption and Photoluminescence Properties of Pr$^{3+}$–doped Znf$_2$–pbO–TeO$_2$ Glasses" Kumar et al., *Jour of Lum*75 (1997) pp 57–62 (No Month).
"On Some Elastic Properties of ZnF$_2$–PbO–TeO$_2$ Glasses Using Ultrasonic Techniques" Kumar et al., *Indian Jour Pure/Applied Phys*, vol. 35, Feb. 97, pp 129–131 (No Month).
"Effect of Chromium Impurity on Dielectric Relaxation Effects of ZnF$_2$–PbO–TeO$_2$ Glasses" Reddy et al., *Indian Jour Pure/Applied Phys*, vol. 33, Jan. 95, pp 48–51.
"Effect of DC Field and x–ray Irradiation on Dielectric Properties of ZnF$_2$–PbO–TeO$_2$ Glasses" Kumar et al., *Phys Stat Sol*, (a) 147 (1995), pp 601–610 (No Month).
"Effect of x–ray Irradiation on Dielectric Properties of ZnF$_2$–PbO–TeO$_2$ Glasses" Kumar et al., *Jour Mat Sci Ltrs*, 13 (1994), pp 1558–1560 (No Month).

* cited by examiner

Primary Examiner—David R. Sample
(74) Attorney, Agent, or Firm—Milton M. Peterson

(57) ABSTRACT

A family of fluorotellurite glasses, the composition of which consist essentially of, as calculated in mole percent, 30–75% TeO$_2$, 15–60% ZnF$_2$ and 0.005–10% of an oxide of erbium, thulium or holmium, and amplifying optical components produced from these glasses.

10 Claims, 2 Drawing Sheets

FLUOROTELLURITE, AMPLIFIER GLASSES

FIELD OF THE INVENTION

Fluorotellurite glasses and their use in telecommunication system components.

BACKGROUND OF THE INVENTION

Optical components, in particular components employing optical fibers doped with rare earth metal ions, are widely used in telecommunication systems. A major application is in signal amplifiers which employ fluorescent ion emission for amplification of a signal. The ion emission occurs within the same operating wavelength region as the signals. Pump energy excites the rare earth metal ion causing it to fluoresce and thereby provide optical gain.

Glasses, doped with a rare earth metal ion and pumped with appropriate energy, exhibit a characteristic, fluorescence intensity peak. The evolution of telecommunication systems, with their increasing demands for bandwidth, has created a need for a rare-earth-doped, amplifier material having the broadest possible emission spectrum in the wavelength region of interest. It is a purpose of the present invention to meet this need.

The bandwidth of a fluorescent intensity curve is, rather arbitrarily, taken as the full width half maximum (FWHM) of the curve in nanometers wavelength. This value is the lateral width of the curve at one half the maximum intensity, that is, at one half the vertical height of the peak of the curve. Unfortunately, many glasses, that exhibit a fluorescence in an appropriate region, exhibit a rather narrow bandwidth. It is a further purpose of the invention to provide a family of glasses that exhibit a relatively broad bandwidth.

It is well known that glasses doped with erbium can be caused to emit fluorescence in the 1520–1560 nm. region. This enables a signal operating in this wavelength range to be amplified. The significance of the 1550 nm. wavelength in optical communication has led to extensive studies regarding the behavior of erbium as a rare earth metal dopant in glasses. It has also led to the study of a variety of glasses as the host for the erbium ion.

Silica glasses, doped with erbium and co-doped with aluminum, have been used to produce optical fibers that are capable of providing gain at 1.5 μm. Recently, glass fibers have been reported that provide greater bandwidth at 1.5 μm, and a flatter gain spectrum, than the silica glass fibers. These fibers are produced from a fluorozirconate glass doped with erbium and known by the acronym ZBLAN.

The fluorozirconate glass is more difficult to fabricate into a low loss fiber, and has poorer chemical durability, than the silica glasses. Consequently, it would be desirable to provide a glass that combines the optical properties of the fluorozirconate glass with the physical properties of the silica glasses. It is a basic purpose of the present invention to provide such glasses.

The literature reports that glasses, composed of $ZnF_2$, PbO and $TeO_2$, exhibit excellent transparency in the 3 to 18 μm region of the spectrum. This has led to proposals that these glasses be used in such products as IR domes, filters and laser windows. Accordingly, extensive studies have been made to determine electrical and physical properties of representative glasses.

It is also known that glasses with moderately low maximum phonon energies, when doped with thulium or holmium, can display fluorescence in the vicinity of 1450 nm and 1650 nm respectively. These wavelengths lie outside of the currently used telecommunications band. However, they lie within the transparency window of most commercial optical fiber. With the ever-increasing demand for useful bandwidth, there will be a need for additional amplifier devices that operate over the remaining portions of this window that are not covered by erbium.

As the concentration of a rare earth metal ion, such as erbium, is increased, the optical gain increases up to a certain point. Beyond this point, the fluorescent signal is quenched, and the optical gain decreases. This phenomenon is considered to result from the dopant, rare earth metal ions interacting with each other in a manner commonly referred to as clustering. It is another purpose of the invention to provide a family of glasses which is readily capable of dissolving erbium ions, and which exhibits a broad bandwidth, thus indicating that clustering is inhibited.

SUMMARY OF THE INVENTION

The invention resides, in part, in a family of fluorotellurite glasses that consist essentially of, as calculated in mole percent, 30–75% $TeO_2$, 15–60% $ZnF_2$ and 0.005–10% of an oxide of erbium, thulium or holmium.

The invention further resides in an optical component for a telecommunication system that is composed of a fluorotellurite glass that has a high thermal stability ($T_x$–$T_g$), that readily dissolves rare earth metal oxides, that has a wide FHWM, and that has a composition consisting essentially of, as calculated in mole percent, 30–75% $TeO_2$, 15–60% $ZnF_2$ and 0.005–10% of an oxide of erbium, thulium or holmium.

BRIEF DESCRIPTION OF THE DRAWINGS

In the accompanying drawings.

DESCRIPTION OF THE INVENTION

Figure 1:
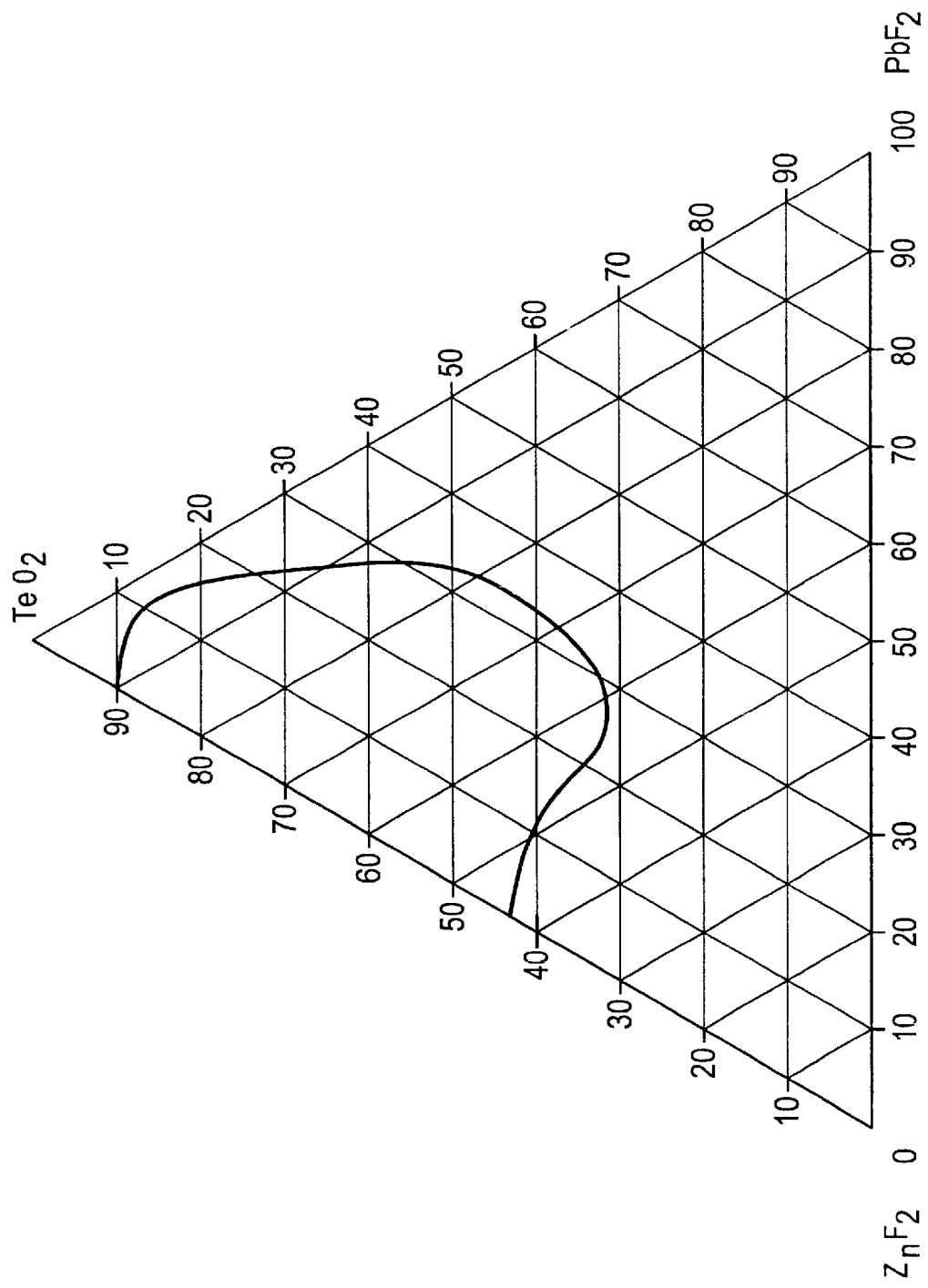
FIG. 1 is a ternary diagram showing the composition area within which the present fluorotellurite glasses can be melted.

The present invention arose from attempts to dope known tellurite glasses, particularly alkali metal tellurite glasses, with fluorine. The intent was to utilize the ability of fluorine to broaden and flatten the erbium emission spectrum. If successful, this would provide an improved optical fiber to amplify an optical signal.

Attempts to introduce even small amounts of fluorine in these glasses resulted in phase separation and consequent opacity. This defeated the purpose because transparency is required in a useful optical component.

Further research revealed that binary glasses, composed of tellurium oxide and zinc fluoride alone, or doped with erbium, could be melted. Of particular significance was the fact that the glasses remained transparent over a broad range of fluorine substitution for oxygen.

It was also found that the glasses, thus produced, exhibited the desired broad, flat emission spectrum when doped with erbium. This was especially important for the commercially used 1.5 μm window. In addition, the glasses exhibit other properties, particularly thermal stability, that enhance their production capability for optical components, such as fibers.

TABLE I sets forth compositions for fluorotellurite glasses representative of the present invention. The compositions are in mole percent on an oxide basis, except for erbium oxide which is in parts by weight. Also shown are thermal stability index values for glasses having the indicated compositions. For comparison purposes, a prior alkali metal tellurite glass composition is shown as Example 8. FHWM values for this glass and that of Example 3 are presented.

TABLE I

|  | 1 | 2 | 3 | 4 | 5 | 6 | 7 | 8 |
|---|---|---|---|---|---|---|---|---|
| $TeO_2$ | 60 | 46 | 55 | 45 | 50 | 50 | 50 | 76 |
| $ZnF_2$ | 40 | 54 | 40 | 40 | 40 | 40 | 40 | — |
| PbO | — | — | 5 | — | — | — | — | — |
| $PbF_2$ | — | — | — | 15 | — | — | — | — |
| $PbCl_2$ | — | — | — | — | 10 | — | — | — |
| $CdF_2$ | — | — | — | — | — | 10 | — | — |
| TlF | — | — | — | — | — | — | 10 | — |
| $Na_2O$ | — | — | — | — | — | — | — | 12 |
| $K_2O$ | — | — | — | — | — | — | — | 12 |
| $Er_2O_3$ (ppm) | 1000 | 1000 | 1000 | 1000 | 1000 | 1000 | 1000 | 500 |
| FWHM (nm) | 49 | — | 49 | — | — | 48 | 42 | 39 |
| $T_x$-$T_g$ (° C.) | 153 | 115 | 156 | 146 | 177 | 146 | 132 | 108 |

The compositions of the inventive, fluorotellurite, amplifier glasses comprise the following approximate ranges in terms of mole %: 30–75% $TeO_2$, 15–60% $ZnF_2$, 0.01–10% $Ln_2O_3$ (where Ln is Er, thulium or holmium). The physical properties of these glasses can be modified by the addition of a number of optional components such as 040% PbO, 0–25% $Tl_2O$, 0–20% CdO, as well as 0–30% $R_2O$ (where R is an alkali metal including Li, Na, K, Rb, or Cs) and 0–25% MO (where M is an alkaline earth metal including Mg, Ca, Ba 10 and Sr). Furthermore, the various oxide constituents can be replaced by the corresponding metal fluorides, chlorides and bromides such that the F, Cl and Br contents of the glass are as high as 70%, 25% and 25% respectively.

FIG. 1 is a ternary diagram showing the composition area within which $ZnF_2$–$TeO_2$ compositions, alone or modified by $PbF_2$, can be melted. Outside of the enclosed area, melts tend to crystallize before they can be formed. In FIG. 1, the apex represents 100% $TeO_2$. The left hand end of the base line represents 100% $ZnF_2$ while the right hand end represents 100% $PbF_2$.

The low phonon energy of tellurite glasses can lead to long emission lifetimes at certain pump wavelengths. As an example, erbium in tellurite glasses exhibits long tau-32 (980 emission) values relative to silicates. These long emission values at the pump wavelength can reduce the efficiency of an amplifier or laser because of excited state absorption. A practical 980 pumping scheme can be obtained by co-doping glasses with components having phonon overtones that are resonant with the energy difference between the 980 and 1530 nm. levels of erbium. Such lightweight components include $H_2O$, $B_2O_3$ and $P_2O_5$.

These glasses may be utilized in bulk form for planar devices. However, it is contemplated that they will also be fabricated in the form of optical fibers. For the latter purpose, the thermal stability of the glass is an important consideration. Accordingly, a large value for the thermal stability index ($T_x$-$T_g$) is significant.

The thermal stability index is the temperature interval between a temperature ($T_x$) and the glass transition temperature ($T_g$). As used here, $T_x$ represents the temperature at the onset of crystal formation. Any development of crystals in the glass can be detrimental.

For drawing of fibers, an index value of at least 100° C., preferably greater than 125° C., is desired. Such an index value, in view of the steepness of the viscosity curve for these glasses, is sufficient to permit fiberization of the glasses in a practical manner for example, by redrawing "rod-in-tube" preforms.

The property features of the inventive glasses are further described with reference to FIG. 2.

Figure 2:
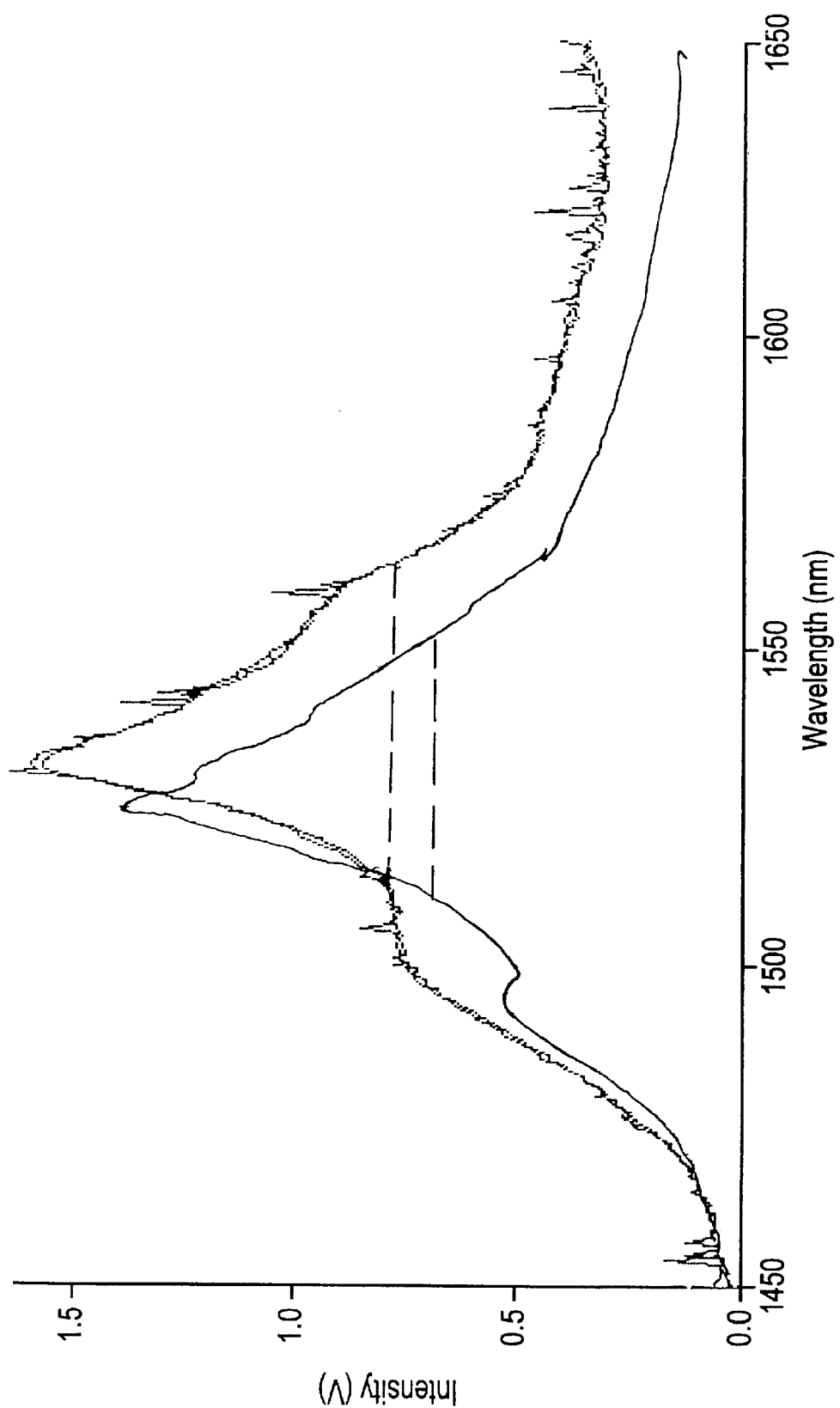
FIG. 2 is a graphical representation comparing the emission spectrum of a glass of the present invention and that of a corresponding prior glass.

FIG. 2 is a graphical representation comparing the emission spectrum of a present fluorotellurite glass with the emission spectrum of a prior alkali tellurite glass. Relative emission intensity is plotted on the vertical axis in arbitrary units (a.u.) for comparison purposes. Wavelength in nanometers, is plotted on the horizontal axis.

Curve A represents the emission spectrum for the known alkali tellurite glass. This glass has the composition of Example 8 in TABLE I. Curve B represents the emission spectrum for a typical fluorotellurite glass of the present invention (Example 3). The dashed, lateral lines indicate the FWHM value for each glass. The flatter and broader character of Curve B, and the consequently greater FWHM value of the glass, are apparent. This is a typical, and significant, feature of the present glasses.

It will be observed that the FHWM value for the glass of Curve A is about 39 nm, whereas the value for the glass of Curve B is about 49 nm. Accordingly, it is a feature of the present glasses that they provide an FHWM value of at least 40 nm, preferably at least 45 nm.

The base glass compositions may be modified, as indicated earlier, to alter the physical properties of glasses having these compositions. In particular, they may be modified for the purpose of providing combinations of core and cladding glasses for an optical fiber. For that purpose, the glasses must exhibit a difference in refractive indices as is well known. Otherwise, however, it is desirable that the core and cladding glasses have properties as near identical as possible.

Tellurite glasses, having compositions as shown in TABLE I, were melted by first mixing a batch in customary manner. The tellurium and lanthanide components were introduced as oxides. The alkali metal oxides, if used, were introduced as either the nitrate or the carbonate. Other components were introduced as indicated. The batch was manually mixed and placed in a 96% silica, or a gold, crucible. The crucible was introduced into an electric furnace operating at 750° C. to melt the batch. Melting time was on the order of 30–60 minutes. The glass thus produced was annealed at a temperature near the transition temperature ($T_g$) of the glass.

I claim:

1. A family of fluorotellurite glasses, the compositions of which consist essentially of, as calculated in mole percent, 30–75% $TeO_2$, 15–60% $ZnF_2$ and 0.005–10% of an oxide selected from the group consisting of erbium, thulium and holmium oxides.

2. A family of glasses in accordance with claim 1 that have a high thermal stability index ($T_x$-$T_g$) to avoid devitrification during glass forming, that readily dissolve rare earth metal oxides to provide fluorescing ions, that have an emission spectrum with a wide bandwidth, and that have compositions consisting essentially of, as calculated in mole percent, 30–75% $TeO_2$, 15–60% $ZnF_2$, and 0.005–10% of an oxide selected from the group consisting of erbium, thulium and holmium oxides.

3. A family of glasses in accordance with claim 1 containing at least one optional, modifying component selected from 0–25% MO where M is an oxide of Mg, Ca, Sr and Ba, and 0–30% $R_2O$ where R is an alkali metal, 0–40% PbO, 0–25% $Tl_2O$ and 0–20% CdO.

4. A family of glasses in accordance with claim 1 wherein a portion of the metal oxides are replaced by metal fluorides and/or chlorides and/or bromides providing that the atomic ratio of the total fluoride, chloride and bromide content to the total halide content plus oxygen content of the glass is not over 70%, 25% and 25% of the glass composition, respectively.

5. A family of glasses in accordance with claim 1 containing a lightweight element selected from B, H, P and mixtures to shorten the tau-32 value of the fluorescing ion erbium.

6. An optical component for a telecommunication system composed of a fluorotellurite glass that has a high thermal stability ($T_x-T_g$), that readily dissolves rare earth metal oxides, that has an emission spectrum with a wide bandwidth, and that has a composition consisting essentially of, as calculated in mole percent, 30–75% $TeO_2$, 15–60% $ZnF_2$ and 0.01–10% of an oxide selected from the group consisting of erbium, thulium and holmium oxides.

7. An optical component in accordance with claim 6 wherein the glass has a 1.5 emission band with a FWHM value of at least 40 and a thermal stability index ($T_x-T_g$) of at least 100° C.

8. An optical component in accordance with claim 6 wherein a portion of the metal oxides in the glass composition are replaced by metal fluoride and/or chloride and/or bromide, the replacement being such that the total fluoride, chloride and bromide contents do not exceed about 70%, 25% and 25% of the glass composition, respectively.

9. An optical component in accordance with claim 6 wherein the component is a clad optical fiber.

10. An optical component in accordance with claim 9 wherein the clad optical fiber is embodied in an optical amplifier.

* * * * *